(No Model.)
C. GAYLORD.
REVOLVING MOLD BOARD FOR PLOWS.
No. 396,397. Patented Jan. 22, 1889.
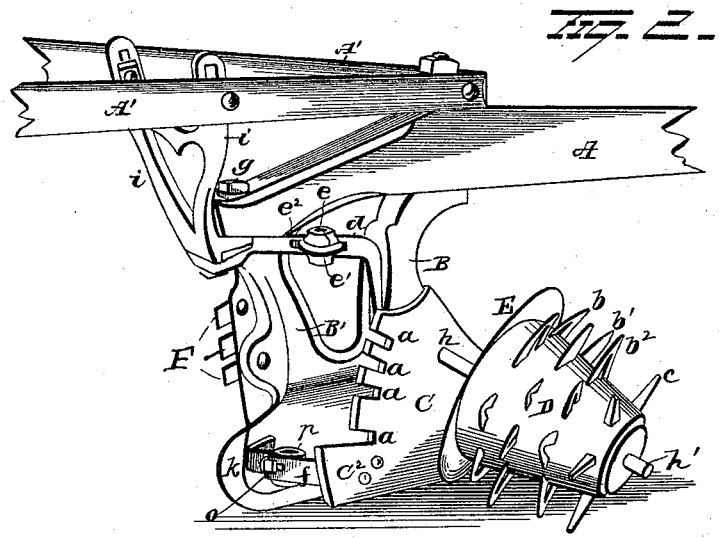
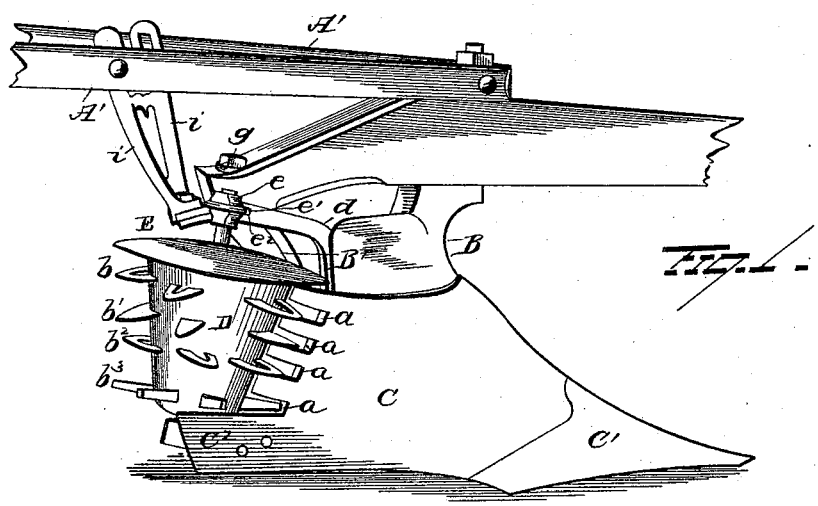
Witnesses
G. F. Downing
S. G. Nottingham
Inventor
Charles Gaylord
By his Attorney
H. A. Seymour

UNITED STATES PATENT OFFICE.

CHARLES GAYLORD, OF EAST WILSON, NEW YORK.

REVOLVING MOLD-BOARD FOR PLOWS.

SPECIFICATION forming part of Letters Patent No. 396,397, dated January 22, 1889.

Application filed June 15, 1888. Serial No. 277,196. (No model.)

*To all whom it may concern:*

Be it known that I, CHARLES GAYLORD, a resident of East Wilson, in the county of Niagara and State of New York, have invented certain new and useful Improvements in Revolving Mold-Board Attachments for Plows; and I do hereby declare the following to be a full, clear, and exact description of the invention, such as will enable others skilled in the art to which it appertains to make and use the same.

My invention relates to an improvement in revolving mold-boards for plows, the object being to provide a simple efficient device whereby the furrow-slice will be disintegrated and pulverized as it is turned over by the action of the plow.

A further object is to furnish a revolving mold-board attachment with a dished disk that is so located with regard to the other portion of the attachment as to have contact with vertically-projecting weeds, plants, or grass and invert the same, so as to cause the furrow-slice to carry them down beneath the loosened soil.

A further object is to provide a set of scrapers which will coact with the revolving mold-board and remove adhesive soil from the surface of the latter when the plow is in use.

With these objects in view my invention consists in certain features of construction and combinations of parts that will be hereinafter described, and pointed out in the claims.

Referring to the drawings making a part of this specification, Figure 1 is a side elevation, in perspective, of a plow with the revolving mold-board attachment in position upon it. Fig. 2 is a right side and rear elevation, in perspective, of a plow adapted to receive the improved revolving mold-board attachment, the latter being removed from place thereon.

A represents the plow-beam, and A′ the handles of the plow. Upon the beam a standard, B, is affixed in the usual manner, upon which the curved-plate mold-board C and plowshare C′ are secured. The standard B has a supplementary portion, B′, made integral with it, which is attached to the rear end of the plow-beam by a bolt, $g$, and on the under side of the beam A, adjacent to the rear limb, B′, of the standard, the bracket-arms $i\ i$ are affixed in place to afford support to the handles A′, upon which their upper ends are bolted.

Below the foot of the integral bracket-arms $i$, where they are joined to the rear limb, B′, of the plow-standards, one end of the forwardly-extended horizontal stay-bar $d$ is secured, the other end of this bar being attached to the front limb, B, of the plow-standard.

Upon the stay-bar $d$ an adjustable and separable journal-box, $e$, is held by a loop-bolt, $e'$, the limbs of which are inserted through a longitudinal slot, $e^2$, which is cut through the stay-bar $d$. The free ends of the loops are not shown, but are secured by any preferred means to the stay-bar in a manner to adapt the loop to clamp the box $e$ in place securely and permit adjustment in the retaining-slot $e^2$, when necessary.

The lower portion of the bifurcated plow-standard B B′ affords a vertical face on which the landside-plate $k$ is attached, and by a bolt, $o$, the lower stay-bar, $f$, is attached to the rear end of the plow-standard on its face, the other end of this stay-bar $f$ extending across the space between the standard-foot and the rearwardly-projecting portion $C^2$ of the mold-board plate C, to which latter it is fastened.

On the lower stay-bar, $f$, just mentioned, there is a box, $p$, formed or secured, the upwardly-inclined perforation through said box being made to align with the upper box, $e$.

The rotative device, which is the main feature of my present invention, consists of an inverted-cone frustum or cylinder, D, which is provided with an axial shaft the extended ends $h\ h'$ of which form journals for the proper support of this tapered cylinder D, these journals having revoluble engagement with the boxes $e\ p$.

The cone-shaped cylinder D may be made of wood incased in sheet metal, or may be constructed entirely of metal in the form of a hollow-cone frustum with proper provision made to support and rigidly secure in axial alignment the journals $h\ h'$.

A series of flattened pins or teeth, $b\ b'\ b^2$, are arranged in several rows, so as to radially project at spaced intervals from the surface of the drum or cylinder D; and it will be seen that the rear edge of the mold-board plate C is cut away to afford room for the cylinder to be located closely to it and have its tapering side wall conform to this inclining edge of the mold-board plate. A number of notches, $a\,a$, &c., are cut in the inclined edge of the mold-board plate C, of a size to allow the rows of teeth $b\,b'\,b^2\,b^3$ to freely pass through them.

It will be observed that the upper row of teeth, $b$, are downwardly inclined, to mate with the upper notch in the mold-board plate, and also that the lower row of teeth, $b^3$, are made heavier and with a wider face than the others above said row, these latter being flattened to form teeth with nearly sharp edges.

Upon the top surface of the cylinder D a circular disk, E, is located, with its peripheral edge concentric with the circumference of the cylinder D, said disk being made concavo-convex, with an overhanging edge that lies immediately above the top edge, $s$, of the mold-board plate C and projecting a proper distance over the rows of teeth $b\,b'\,b^2$, as shown.

Upon the rear vertical edge of the standard B' a series of scraper-blades, F, are secured adjustably and removably by bolts passing through them and the flange of this rear limb of the plow-standard. The blades are so relatively located that their sharpened projecting edges will bear lightly upon the surface of the conical cylinder D and remove all soil which may adhere to the same, the blades being set properly to allow the teeth $b\,b'$, &c., to pass freely between them.

In operation the progressive movement of the plow will cause the cut furrow-slice to impinge against the projecting teeth $b\,b'\,b^2\,b^3$, and as the lower teeth last mentioned have a wider surface of contact with the turning furrow-slice than the upper rows these lower teeth act as drivers to rotate the cylinder D and cause the other teeth to rapidly tear and cut the ground-slice, pulverizing it to a depth corresponding to the length of the teeth, and as the upper portion of the cylinder D is proportionately increased in diameter, the larger portion of the cone-frustum being located below the disk E, it is evident that this conical cylinder will coact with the mold-board plate C and complete the inversion of the furrow-slice as it is being pulverized by the teeth of said cylinder D. When the plow is in motion, the sharp edge of the concave disk E will cut through the top surface of the ground-slice as it is forced in contact therewith, and as the furrow is turned over by the conical cylinder D this top portion will be thrown on the bed of the furrow, to be covered by the pulverized soil of the body of the furrow. In this way all weeds, stubble, or grass will be deposited beneath the turned furrow.

The proportions of the cylinder, teeth, and disk may be varied to suit the nature of the work to be executed by the plow, and slight changes may be made in the details of construction of this attachment to a plow without exceeding the evident scope and spirit of my invention; hence I do not wish to confine myself to the exact forms herein shown; but, Having fully described my invention, what I claim as new, and desire to secure by Letters Patent, is—

1. The combination, with a plow-standard and a mold-board, of a conical drum or cylinder having teeth that radiate from its side, substantially as set forth.

2. The combination, with a mold-board supported on a plow-beam, of a conical cylinder supported to rotate near the rear edge of the mold-board, and attached radial teeth, substantially as set forth.

3. The combination, with a mold-board, a standard, and a plow-beam, of a conical cylinder having rows of teeth radiating from its side surface adapted to register with notches cut in the adjacent edge of the mold-board, substantially as set forth.

4. The combination, with a mold-board and a revolubly-supported conical cylinder having rows of radial teeth, of a disk mounted on the top of the conical cylinder and adapted to rotate with it, substantially as set forth.

5. The combination, with a mold-board, a standard, and a plow-beam, of a conical cylinder, boxes to support the cylinder, journals axially affixed in the cylinder to engage these boxes, and rows of radial teeth secured in the cylinder so as to project through notches made in the mold-board and be rotated by the impinge of a furrow-slice cut by the plow, substantially as set forth.

6. The combination, with a plow-beam, a standard, a mold-board, and a plowshare, the mold-board plate being notched at intervals, of a cylinder, teeth arranged in rows which project radially from the side surface of the cylinder, journals affixed axially in the ends of the cylinder, boxes adapted to revolubly support the cylinder, and a convex cylinder-disk secured concentric with the cylinder on its upper end, substantially as set forth.

7. The combination, with a plow-standard, of a mold-board, a revoluble tapering cylinder, teeth affixed radially in the cylinder, and scrapers adapted to bear on the surface of the cylinder between the rows of teeth, substantially as set forth.

8. The combination, with a plow-beam, a standard, a mold-board, plowshare, and landside, of a revoluble conically-tapered cylinder, rows of teeth radially projecting from the cylinder, notches made in the mold-board to receive the teeth and allow them to move freely therein, and a series of scraper-blades made to project from the standard and be in position to scrape the soil from the cylinder between the rows of teeth, substantially as set forth.

In testimony whereof I have signed this specification in the presence of two subscribing witnesses.

CHARLES GAYLORD.

Witnesses:
FRANK M. GRAHAM,
S. CADY MURRAY.